United States Patent [19]
Yokota

[11] Patent Number: 5,713,556
[45] Date of Patent: Feb. 3, 1998

[54] COMPOSITE-ACTION BUTTERFLY VALVE

[75] Inventor: Hiroshi Yokota, 11-11-302, Midori 1-Chome, Minami-Ku, Hiroshima-Shi, Hiroshima-Ken, Japan

[73] Assignees: Kabushiki Kaisha Yokota Seisakusho; Hiroshi Yokota, both of Hiroshima, Japan

[21] Appl. No.: 687,579

[22] PCT Filed: Jan. 31, 1995

[86] PCT No.: PCT/JP95/00127

§ 371 Date: Oct. 21, 1996

§ 102(e) Date: Oct. 21, 1996

[87] PCT Pub. No.: WO95/22022

PCT Pub. Date: Aug. 17, 1995

[30] Foreign Application Priority Data

Feb. 9, 1994 [JP] Japan .................. 6-015287
Jan. 30, 1995 [JP] Japan .................. 7-012935

[51] Int. Cl.[6] ........................... F16K 1/16
[52] U.S. Cl. ................... 251/249.5; 251/228
[58] Field of Search .................. 251/228, 248, 251/249.5, 305

[56] References Cited

U.S. PATENT DOCUMENTS 2,809,010  10/1957  Lpsey et al. ............... 251/228 X
5,078,363   1/1992  Gregory .................... 251/228 X

FOREIGN PATENT DOCUMENTS 48-102318  12/1973  Japan.
60-19866    2/1985  Japan.

*Primary Examiner*—John Fox
*Attorney, Agent, or Firm*—Ladas & Parry

[57] ABSTRACT

The present invention provides a high-performance, economical valve. In the valve, a valve element (4) is supported by a valve element support shaft (6) on an arm member (5) with a degree of freedom of turning, and the arm member (5) is supported by a valve element operating shaft (7) supported on a valve casing (1) at a position thereon spaced a distance apart from a position thereon at which the valve element support shaft (6) supports the valve element (4) on the arm member (5). One end par (4a) of the valve element (4) is biased constantly toward one end part (5a) of the arm member (5). When the valve is opened in a fully open state by applying external torque to the valve element operating shaft (7), the valve element (4) extends along the streamline of fluid flow to reduce head loss due to resistance exerted by the valve element (4) on fluid flow. The valve element (4) is brought into uniform, close contact with a sealing surface (3m) of a valve seat (3) to stop fluid flow.

10 Claims, 2 Drawing Sheets

5,713,556

COMPOSITE-ACTION BUTTERFLY VALVE

TECHNICAL FIELD

The present invention relates to a valve to be installed in a fluid transport line to regulate stop fluid flow by composite actions of a valve element relative to a valve seat. In this description, the term "fluid" is used as a general term for liquids and gases.

BACKGROUND ART

As is generally known, butterfly valves, gate valves, ball valves and globe valves have universally been used for regulating and stopping fluid flow.

In most prior art valves, a valve element fixed to an arm member is opened and shut by operating a handle or the like. Such valves are economical in their own as long as the valves are used under non-severe service conditions. However, various technical problems arises in prior art valves due to structural restrictions thereon the valves are used under severe service conditions for handling high-temperature, high-pressure slurry, corrosive fluids or the like.

Examples of technical problems that may arise in prior art valves will be explained.

(A) As regards the butterfly valve shown in FIG. 2, head loss across butterfly valves due to resistance exerted by butterfly valves on fluid flow is low when the butterfly valve is in a fully open state. The structure of butterfly valves requires the valve element to sidle up to the valve seat to rest on the valve seat. (Such a mode of closing movement of the valve element will be referred to as "slide sidling" for the sake of convenience in the following description.) Slide sidling of the valve element entails the abrasion of sealing surfaces that deteriorates the tightness of the sealing surfaces. It is difficult to achieve uniform, close contact between the sealing surfaces even if the sealing surfaces are formed in spherical surfaces or an eccentric valve element driving shaft is employed. Furthermore, the valve element and the valve seat will be damaged if a foreign matter is stuck between the sealing surfaces when seating the valve element on the valve seat. Although various attempts, such as putting elastic members on the sealing surfaces, have been made to secure satisfactory tightness, those attempts are symptomatic means merely capable of supplementing imperfect tightness. Durability of elastic members formed of rubber or the like is insufficient when used under severe service conditions, such as conditions requiring handling high-temperature, high-pressure slurry, corrosive fluids or the like. Elastic members of a metal must be formed in a very intricate construction to provide the elastic members with satisfactory elasticity.

(B) As regards gate valves, the valve element slides substantially in parallel to the valve seat for opening and shutting. Therefore, gate valves exert high resistance on fluid flow, cause rapid abrasion, and need elastic members to be put on the sealing surfaces to secure satisfactory tightness, which entails problems similar to those entailed by butterfly valves.

(C) As regards ball valves, head loss across ball valve due to resistance exerted on fluid flow is low when the ball valve is in a fully open state. However, the mating surfaces of the valve element and the valve seat must be finished in precision spherical surfaces, elastic members need to be put on the sealing surfaces to secure satisfactory tightness, which entails problems similar to those entailed by butterfly valves.

(D) Globe valves are less subject to problems in material and machining than butterfly valves, gate valves and ball valves, and are capable of securing satisfactory tightness. However, head loss across globe valves due to resistance exerted on fluid flow is large when the globe valves are in a fully open state.

The problems discussed in (A) to (D) by way of example become more serious as the size of valves increases and result from the interrelation of intricate conditions. Accordingly, it has been believed that it is difficult, from the viewpoint of structure, to simultaneously achieve reduction of head loss when the valve is fully open, avoidance of frictional abrasion due to the slide sidling and the uniform, close contact between the sealing surfaces, and any effective techniques have not been developed.

Accordingly, it is an object of the present invention to provide a high-performance, economical valve having a simple, rational structure, capable of radically solving those technical problems which could not have been solved, of being easily designed and manufactured, of enabling the use of all kinds of materials including metals and ceramic materials and of enduring the harmful actions of high-temperature, high-pressure slurry and corrosive fluids, and not causing problems when formed in a large size.

DISCLOSURE OF THE INVENTION

The present invention will be described concretely with reference to FIG. 1 showing a preferred embodiment of the present invention.

A composite action butterfly valve has a valve casing 1 disposed between and joined to pipes 16 and 17 included in a fluid transport system. A valve top 2 and a valve seat 3 are mounted on the valve casing 1. The composite action butterfly valve forms a passage between passages a and b. (The composite action butterfly valve functions to deal with either fluid flow from the passage a toward the passage b or fluid flow from the passage b toward the passage a.) A valve element 4 is supported with a necessary degree of freedom of turning by a valve element support shaft 6 on an arm member 5. (In the embodiment shown in FIG. 1, the valve element 4 is supported at its middle part by the valve element support shaft 6 for clear conceptional illustration.) The arm member 5 is supported on the valve casing 1 by a valve element operating shaft 7 at a position thereon spaced an appropriate distance apart from a position thereon where the valve element support shaft 6 supports the valve element 4 on the arm member 5. Torque is applied to the valve element operating shaft 7 by means of a handle or an electric motor or the like to open and close the valve element 4. A resilient member 9, such as a spring, is extended between one end part 4b of the valve element 4 and one end part 5b of the arm member 5 so as to bias the other end part 4a of the valve element 4 toward the other end part 5a of the arm member 5. An inclination limiting member 8 is provided on either the valve casing 1 or the valve top 2 for the purpose of causing the valve element 4 to be seated on the sealing surface 3m of the valve seat as perpendicularly as possible to the surface 3m. When the valve element 4 has approached its closing position, the valve element is caused to abut on the inclination limiting member 8 and prevented to turn further. The valve element 4 and the arm member 5 are formed in shapes that exert a relatively low resistance to fluid flow, and have a strength necessary for operation.

When the composite action butterfly valve is in a fully open state, the valve element 4 lies in parallel to a streamline of fluid flow so that head loss due to resistance exerted by the valve element 4 on fluid flow is low. In this fully open state, substantially equal pressures act on the surface of one part of the valve element on one side of the valve element support shaft 6 and that of the other part of the same on the other side of the valve element support shaft 6. Therefore, a fluid applies to the valve element 4 only a slight force that attempts to turn the valve element 4 around the valve element support shaft 6. The urging force of the resilient member 9 biasing the end part 4a of the valve element 4 toward the end part 5a of the arm member 5 exceeds the force applied to the valve element 4 by the fluid and, consequently, the end part 4a of the valve element 4 is kept in contact with the end part 5a of the arm member 5.

When torque is applied to the valve element operating shaft 7 by means of a handle or an electric motor or the like in a clockwise direction as viewed in FIG. 1 for a valve closing operation, the valve element 4 with the end part 4a thereof kept in contact with the end part 5a of the arm member 5 is turned around the valve element operating shaft 7 together with the arm member 5 through a half closed position and approaches the valve seat 3. Then, (i) the end part 4a of the valve element 4 first abuts against the inclination limiting member 8, (ii) the end part 5a of the arm member separates from the end part 4a of the valve element, (iii) the end part 4b of the valve element rests gently on the valve seat 3, and (iv) the end part 4a of the valve element 4 moves away from the inclination limiting member 8 and is finally seated on the valve seat 3.

The valve element 4 can be caused to move substantially perpendicularly to the sealing surface 3m of the valve seat 3 at the moment the valve element 4 is seated on the valve seat 3, by appropriately selecting the fixing position of the inclination limiting member 8 so that the harmful effects of slide sidling are avoided. The freedom of movement of the valve element 4 relative to the valve element support shaft 6 functions effectively to secure the uniform, close contact of the valve element 4 with the sealing surface 3m. When the fluid flows from the passage b toward the passage a, the valve element 4 can be brought into further firm contact with the sealing surface 3m because the pressure of the fluid serves also as a valve closing force.

The foregoing series of processes is reversed to open the composite action butterfly valve.

The embodiment of the present invention shown in FIG. 1 solves clearly and economically the problems which could not have been solved by the prior art. It will be understood from an observation of the process of the above stated valve closing operation that the composite action butterfly valve has an additional advantage that fine flow regulation is possible in a state where the flow rate of the fluid is very low.

BEST MODE FOR CARRYING OUT THE INVENTION

Although the composite action butterfly valve of the present invention produces novel operative effects as described above with reference to FIG. 1 showing a typical embodiment of the invention, the composite action butterfly valve is capable of meeting practical requirements by incorporating various structural changes and prior art techniques according to the gist of the present invention.

Figure 1:
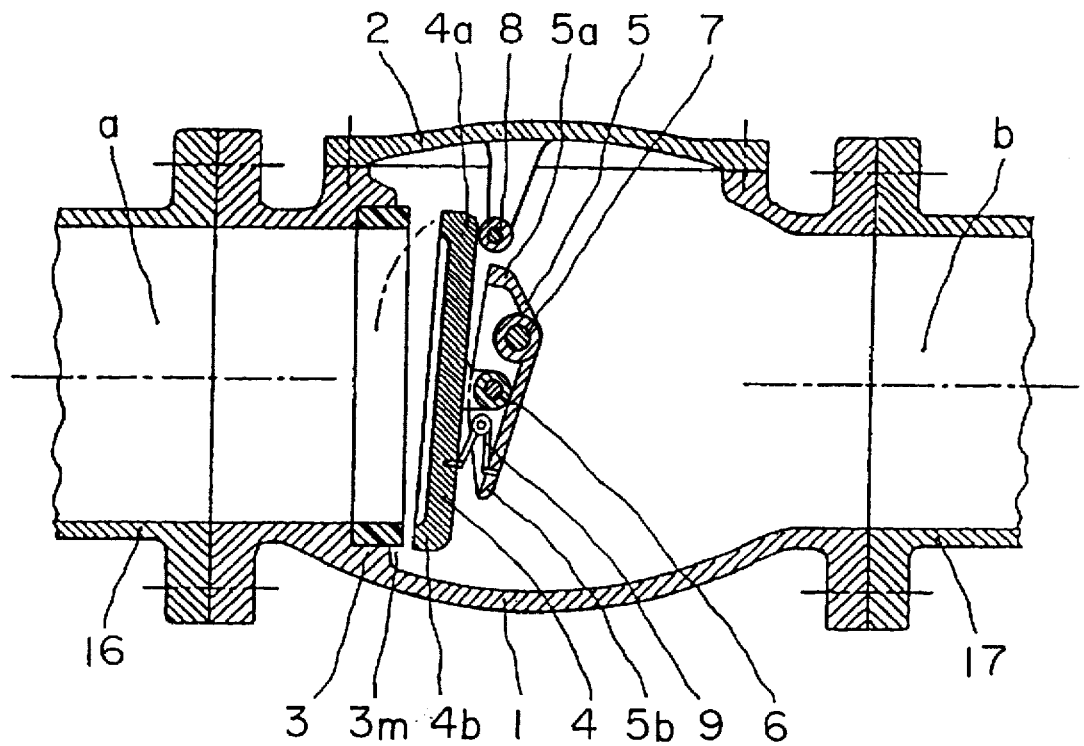
FIG. 1 is a longitudinal sectional view of a composite action butterfly valve in a first embodiment according to the present invention in a state immediately before the valve closing.
Figure 2:
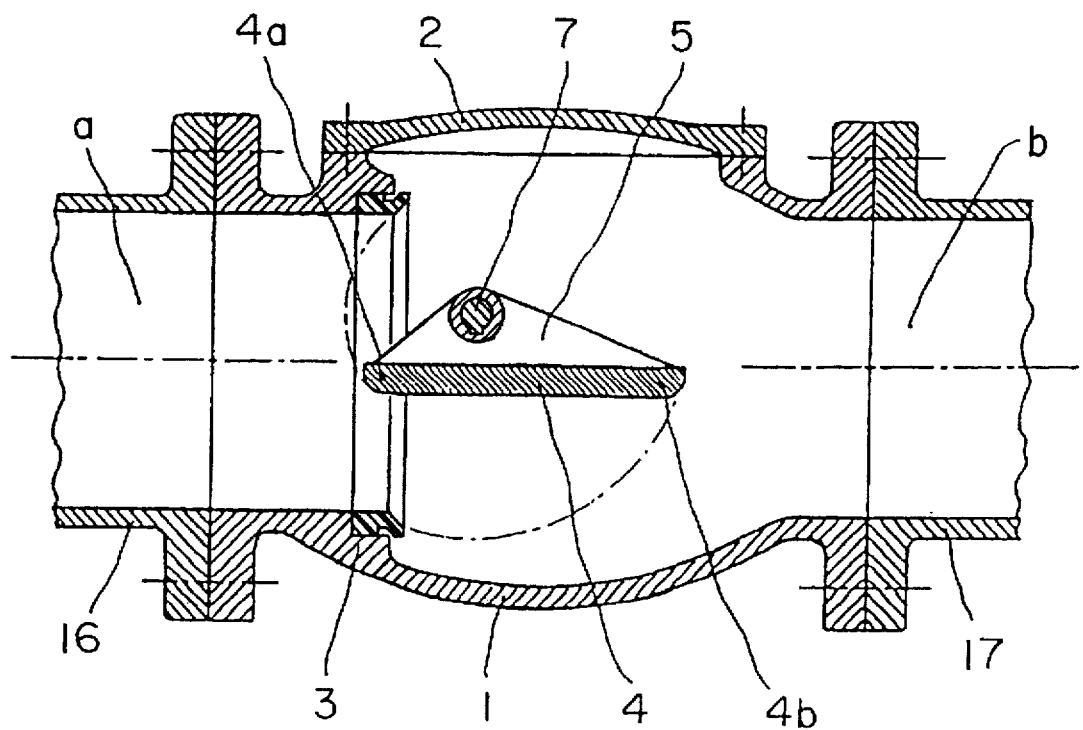
FIG. 2 is a longitudinal sectional view of an example of prior art (butterfly valve)

For example, the shape, material and position of the resilient member 9, such as a spring, of the composite action butterfly valve shown in FIG. 1 for biasing the end part 4a of the valve element 4 toward the end part 5a of the arm member 5 may selectively be determined. The valve element 4 may be formed so that its center of gravity is dislocated from a position corresponding to the valve element support shaft 6 to produce a force for biasing the end part 4a of the valve element 4 toward the end part 5a of the arm member 5 by its own weight. It is also possible that the valve element support shaft 6 supports the valve element 4 at a position on the side of the end part 4b with respect to the middle of the valve element 4 (when the fluid flows from the passage a toward the passage b) or at a position on the side of the end part 4a with respect to the middle of the valve element 4 (when the fluid flows from the passage b toward the passage a) to use the pressure of the fluid for biasing the valve element 4.

Naturally, it is desirable to adjust the shape of the valve element 4 so that head loss due to resistance exerted by the valve element 4 on fluid flow is reduce to the least possible extent. Similarly, the arm member 5 may be formed in a shape that reduces head loss, and the combination of the valve element 4 and the arm member 5 may be formed in a shape resembling a streamline shape. Though not shown in the drawings, the valve element support shaft 6 and the valve element operating shaft 7 may be provided at the two transverse ends of the valve element 4 so that the shafts 6 and 7 clear the main flow pass in the valve.

Current straightening projections employed in prior art to suppress turbulent flow and cavitation may be formed on the valve seat 3 and the valve element 4. Further, as shown in FIG. 1, the inclination limiting member 8 may be made to have a contour functioning as a flow regulating protrusion since the inclination limiting member 8 is located in a region in which cavitation is to be suppressed.

The contact surface of the valve element 4 and the sealing surface 3m of the valve seat 3 may be tapered surfaces, i.e., conical surfaces, or curved surfaces instead of simple flat surfaces as shown in FIG. 1. The contact surfaces of the valve element 4 and the sealing surface 3m of the valve seat 3 may be formed in sectional shapes other than right circular shapes, such as optional circular shape or rectangular shapes, to secure appropriate flow control characteristics (valve opening to flow rate ratio).

The valve seat 3 and the valve element 4 may entirely be made of metals, respectively. An elastic member, such as an O-ring may be attached to the sealing surface if necessary. Since the valve seat 3 and the valve element 4 are not subject to frictional abrasion due to slide sidling, the valve seat 3 and the valve element 4 may be made of ceramic materials. Thus, materials for making the valve seat 3 and the valve element 4 can be selected from among a large variety of materials.

The valve element support shaft 6 may be of any suitable prior art technique. The valve element support shaft 6 of the composite action butterfly valve shown in FIG. 1 is extended with its axis extending in parallel to the axis of the valve element operating shaft 7. The valve element support shaft 6 may be provided with a universal joint to enable the valve element 4 to be moved in different directions with respect to the sealing surface 3m within a limited range of motion. In either case, the valve element 4 can be held in a correct closing position when the same is moved for valve closing operation and can be seated on the valve seat 3 in uniform, close contact with the valve seat 3. If, by any chance, an foreign matter is caught between the sealing surface 3m and the valve element 4 at the moment the valve element 4 is seated on the valve seat 3, the freedom of motion of the valve element 4 relative to the arm member 5 protect the valve element support shaft 6, which is an important member. The valve element operating shaft 7 may be supported eccentrically to make the valve element operating shaft 7 exert a cam effect so that the valve element 4 can be operated in a further advanced mode of operation.

Figure 3:
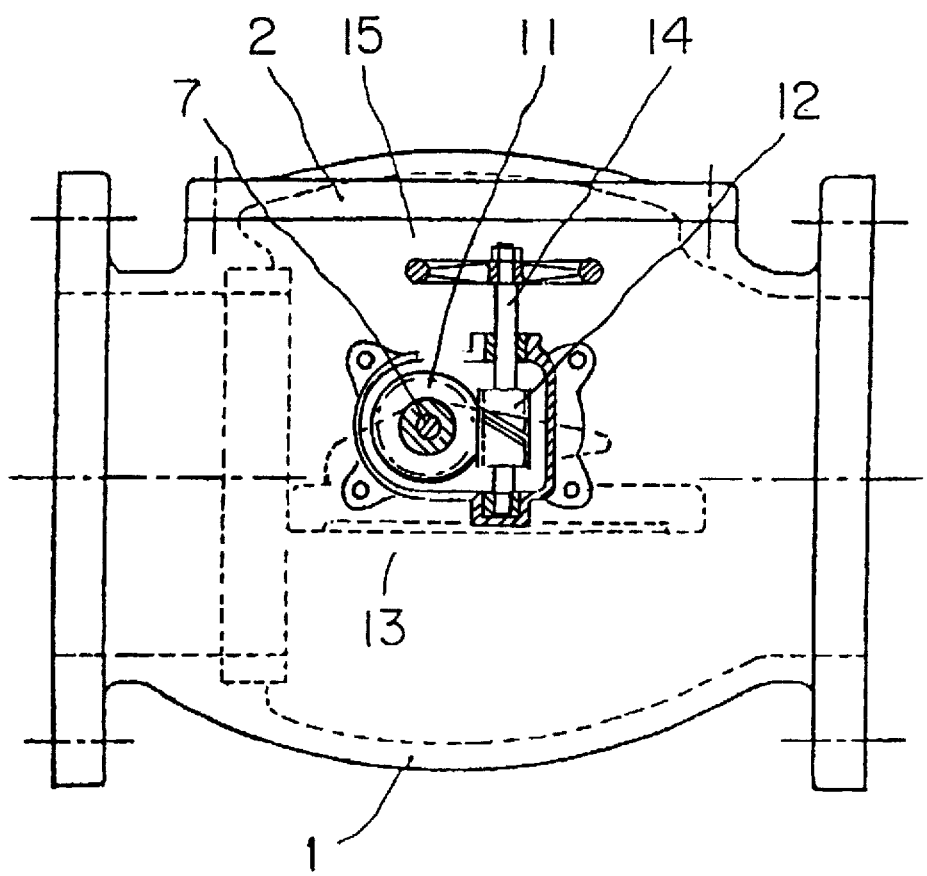
FIG. 3 is a partly sectional explanatory view of a valve element driving unit used in an embodiment of the present invention, in which the valve is in a substantially fully open state.

The magnitude of torque necessary for turning the valve element operating shaft 7 is dependent on the distance between the valve element support shaft 6 and the valve element operating shaft 7; that is, the shorter the distance between the shafts 6 and 7, the lower the torque necessary for turning the valve element operating shaft 7. Design conditions are flexible and may be determined according to service conditions. When the magnitude of the torque requires, a valve operating shaft 14 and the valve element operating shaft 7 may be interlocked by a irreversible reduction gear, such as a worm gearing comprising components 11, 12 and 13 as shown in FIG. 3.

INDUSTRIAL APPLICABILITY

As is apparent from the foregoing description, the present invention employs a simple, clear structure based on a novel technical idea to solve the problems in the prior art valves drastically, and employs easy, economical technical means to realize a novel composite action butterfly valve reducing head loss due to resistance exerted by its valve element on fluid flow in a fully open state and provided with a valve element capable of being seated substantially perpendicularly to a valve seat without frictional abrasion and in uniform, close contact with the sealing surface of the valve seat. The composite action butterfly valve may entirely be made of metals, may be provided with components made of ceramic materials or other suitable materials. Therefore, economical materials for forming the components can easily be selected. The composite action butterfly valve of the present invention can be installed at various parts in fluid transport facilities that operate under various service conditions for handling high-temperature, high-pressure slurry, corrosive fluids and the like, and require large valves. Thus, the present invention produces outstanding effects on designing, manufacturing, maintaining and controlling valves and has very prominent practical effects as compared with those of prior art.

I claim:

1. A composite action butterfly valve to be installed in a pipeline for transporting a fluid, comprising: a valve casing (1); a valve seat (3); a valve element (4) provided for valve opening and closing operation relative to the valve seat (3) to regulate the flow rate of the fluid; an arm member (5); a valve element support shaft (6) supporting the valve element (4) on the arm member (5) so that the valve element (4) is able to turn with a degree of freedom of turning relative to the arm member (5); and a valve element operating shaft (7) supported on the valve casing (1) and supporting the arm member (5) at a position on the arm member (5) other than that at which the valve element support shaft (6) supports the valve element (4) on the arm member (5); wherein force is applied constantly to the valve element (4) so that one end part (4a) of the valve element (4) is biased in a turning direction toward one end part (5a) of the arm member (5), and external torque is applied to the valve element operating shaft (7) for flow rate regulating operation; and wherein an inclination limiting member (8) is provided on the valve casing (1) or a valve top (2), said inclination limiting member (8) being positioned for abutment with the valve element (4) to limit the turning movement of the valve element (4) during a valve closing process.

2. A composite action butterfly valve to be installed in a pipeline for transporting a fluid, comprising:
   a valve casing (1) having a fluid passage therein;
   a valve seat (3) provided in said fluid passage having a sealing surface (3m) extending across the fluid;
   a valve element operating shaft (7) provided adjacent to said valve seat (3) and supported by said valve casing (1) so as to extend across said fluid passage;
   an arm member (5) pivotably supported at an intermediate portion thereof by said valve element operating shaft (7);
   a valve element support shaft (6) provided on said arm member (5) and extending in parallel spaced disposition with said valve element operating shaft (7);
   a valve element (4) provided fox movement relative to said valve seat (3) for valve opening and closing operation to regulate a flow of the fluid through said fluid passage, said valve element (4) being pivotably supported at an intermediate portion thereof by said valve element support shaft (6) in such a manner that one end part (5a) of the arm member (5) confronts one end part (4a) of the valve element (4) and another end part (5b) of the arm member (5) confronts another end part (4b) of the valve element (4);
   a resilient member (9) for urging said arm member (5) and said valve element (4) in a normal state in which said other end parts (5b,4b) are biased away from each other by said resilient member (9) and hence said one end parts (5a,4a) are abutted against each other, said arm member (5) and said valve element (4) being able to turn together about said valve element operating shaft (7), maintaining said normal state, in a direction from a valve-opening position in which said arm member (5) and valve element (4) are oriented to extend substantially perpendicularly to said sealing surface (3m), to a valve-closing position in which said arm member (5) and said valve element (4) are turned substantially beyond an attitude wherein said valve element (4) is parallel to said sealing surface (3m); and
   an inclination limiting member (8) provided stationarily within said valve casing (1) at a position to abut against only said one end part (4a) of the valve element (4), during turning of said arm member (5) and valve element (4) in said direction toward said valve-closing position, to thereby stop the turning of the valve element (4) while allowing further turning of the arm member (5) against said resilient member (9), said further turning causing said valve element support shaft (6) to exert a force to press said valve element (4) into sealing contact with said sealing surface (3m).

3. The composite action butterfly valve according to claim 2, wherein said valve casing (1) has an axis along which the fluid flows and said valve element operating shaft (7) is located at a position nearer to said axis than said valve element support shaft (6).

4. The composite action butterfly valve according to claim 2, wherein said valve element support shaft (6) is located at a position nearer to said axis than said valve element operating shaft (7).

5. The composite action butterfly valve according to claim 2, wherein said resilient member (9) comprises a compression spring.

6. The composite action butterfly valve according to claim 2, wherein said inclination limiting member (8) is fixed to said valve casing (1).

7. The composite action butterfly valve according to claim 2, wherein said valve casing (1) has a removable valve top (2) and said inclination limiting member (8) is fixed to said valve top (2).

8. The composite action butterfly valve according to claim 2, further comprising a valve operating shaft (14) provided outside said valve casing (1) and coupled to said valve element operating shaft (7).

9. The composite action butterfly valve according to claim 8, further comprising an irreversible reduction gear mechanism (11,12,13) intercoupled between said valve operating shaft (14) and said valve element operating shaft (7).

10. The composite action butterfly valve according to claim 2, wherein said resilient member (9) is disposed between said other end part (5b) of the arm member (5) and said other end part (4b) of the valve element (4).

* * * * *